April 20, 1965
T. H. COLLINS
3,179,298
PACKAGE AND SPREADER
Filed Sept. 20, 1963
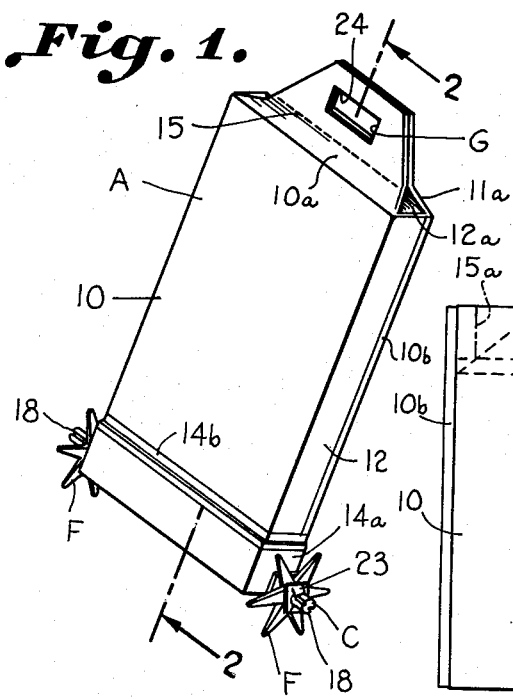
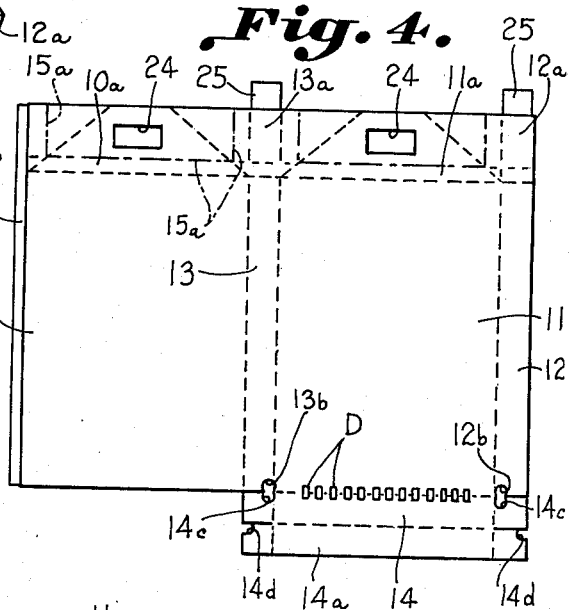
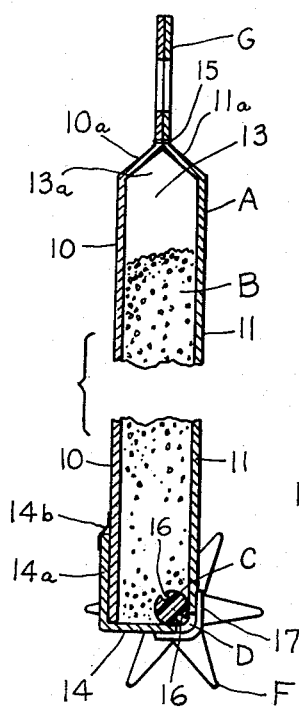
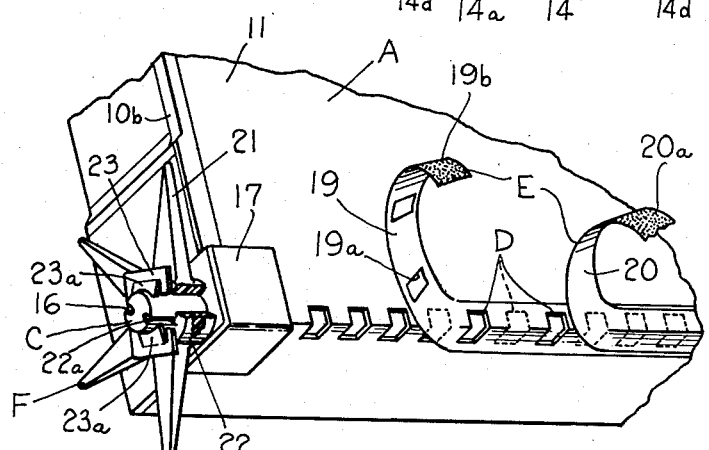
INVENTOR.
THOMAS H. COLLINS
BY
ATTORNEY United States Patent Office 3,179,298
Patented Apr. 20, 1965

3,179,298
PACKAGE AND SPREADER
Thomas H. Collins, 1348 Coosaw Drive, West Oak Forest, Charleston, S.C.
Filed Sept. 20, 1963, Ser. No. 310,436
2 Claims. (Cl. 222—177)

This invention relates to packaging and spreading fertilizer and the like.

Fertilizer and other plant and soil treating material are customarily packaged in bags which must be opened and the material transferred to a spreader. For average home consumption for example, this is a burdensome task. A spreader must be rented and returned if the expensive involved in the purchase of a spreader is unjustified. The heavy sacks of fertilizer are difficult to manipulate and the pouring of the fertilizer into the spreader is a messy job. Packaging the fertilizer in containers sufficiently rugged to transport is expensive and a second expense is involved in the spreading. Lightweight granular fertilizer is now available, and it is with such fertilizer that the advantages of the present invention are best realized.

Accordingly, it is an important object of this invention to provide a portable combined package and spreader for fertilizer and the like.

Another important object of the invention is to provide a continued package and spreader in which the package serves also as a spreader for distributing measured amounts of fertilizer and the like.

Another object of the invention is to provide a portable article of merchandise in which a container of a cardboard like blank construction is substantially filled with fertilizer and in which the container has a handle at the top and dispensing means at the bottom for easy handling as a package and for ready use as a spreader.

Still another important object of this invention is to provide a package for lightweight fertilizer and the like which may be easily handled and used as a spreader for the fertilizer.

Yet, another object of the invention is the provision of a combined package and spreader in which spiked wheels agitate and feed measured amounts of granular fertilizer and the like from dispensing means in the package.

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIGURE 1 is a perspective view illustrating a package and spreader constructed in accordance with the present invention, FIGURE 2 is an enlarged transverse sectional elevation taken on the line 2—2 in FIGURE 1, FIGURE 3 is an enlarged perspective view looking toward the rear right-hand lower corner of the package and spreader illustrated in FIGURE 1, and FIGURE 4 is a plan view of the blank from which the package and spreader is essentially constructed.

The drawing illustrates a combination package and spreader for granular fertilizer and the like. An elongated container A is constructed of relatively stiff cardboard like blank material for containing the fertilizer B. The container has a straight lower corner portion adjacent the surface upon which the fertilizer is to be spread when held inclined thereto in spreading position. A shaft C is disposed in the lower corner portion of the container and has a scalloped portion therein for feeding metered amounts of fertilizer. An open dispensing portion D is located in the lower corner portion. The dispensing means is illustrated as being effectively covered by said shaft to substantially limit the fertilizer dispensed therethrough to that delivered thereto by the scalloped portion. A removable means E covers the dispensing portion other than when spreading the fertilizer. Spiked wheels F may be carried by the shaft for moving the container over the surface upon which fertilizer is to be spread while operating the metering means with proper agitation to insure the proper delivery of fertilizer to the dispensing portion. Thus, granular fertilizer may be packaged and distributed from a single container in metered amounts. The blank construction forming the container has a handle member G at the top thereof making a package of lightweight fertilizer readily portable for handling and spreading.

The elongated container A is preferably constructed of cardboard or other similar relatively stiff material. The container generally includes a front 10, a back 11 and sides 12 and 13. A bottom 14 includes an upturned flap 14a which is suitably fastened to the front and sides as by tape material 14b. A top is formed by folds 10a and 11a extending upwardly from the front 10 and back 11 and folds 12a and 13a extending upwardly from the sides 12 and 13, respectively. The container is closed by stitching the folds as at 15. The side 12 may be fastened to the front 10 as by tape 10b.

The granules B which are contained within the container A may be fertilizer of the lightweight type in which vermiculite is used as a carrier for the plant nutrients. It has been found that such lightweight fertilizer may be of such a composition that on the order of one-third less weight is required to supply the nutrients provided by a comparable standard type of fertilizer. Through the use of free flowing fertilizer, such as granular fertilizer commonly is, it is possible to spread such in metered amounts upon the surface to be fertilized.

A shaft C is provided with scalloped portions 16 which collect granules in measured amount for distribution through the dispensing means described below. The shaft C may be constructed of plastic or any suitable material and positioned adjacent one of the bottom corners of the container A along the major dimension thereof. The shaft C is journaled in the side portions 12 and 13 of the container A. It will be noted by reference to FIGURE 4 that three thicknesses of material will be provided. Cut-out portions 12b and 13b are provided in the sides, and a cutout portions 14c is provided in the bottom 14a together with cutout portions 14d in the upturned portion 14a. If desired, an additional reinforcing tab 17 may be provided in each corner to supply additional bearing surfaces. The tabs 17 may be constructed of plastic if desired. The shaft C has projecting end portions 18 which extend beyond the bearing surfaces just described.

An open dispensing means in the form of a plurality of spaced apertures D is located in the corner of the container A adjacent the shaft C so that the fluted portions 16 of the shaft C are in register therewith. It will be noted that a first tape 19 having apertures 19a therein may be placed over the apertures D, thus covering every other aperture D. A second tape 20 having no apertures therein, may then be placed over the tape 19 to entirely close the apertures D. Thus, it is possible to provide a light treatment of fertilizer by removing only one tape, or a heavier application of fertilizer by removing both of the tapes E. The backs of the tapes are provided with a pressure sensitive adhesive 19b and 20a, respectively.

The wheel F is preferably constructed of plastic and has a plurality of projecting fingers or spikes 21, which are joined in a central hub 22. The hub 22 may be pressed upon the ends 18 of the shaft C. If desired, a clip member 23, preferably constructed of plastic and having opposed flaps 23a may be provided for confining the hub 21 upon the shaft. The hub 22 is provided with a projection 22a which extends into the scalloped portion 16 to prevent rotation of the wheel upon the shaft. The handle G is formed from cutout portions 24 in the upwardly projecting flaps 10a and 11a, respectively. When closing the flaps the stitching extends along the stitch lines 15a and if necessary, flaps 25, preferably constructed of cloth are stitched to close the ends of the flaps. The flaps are suitably carried by the sides 12 and 13. Thus, as illustrated in FIGURE 4, the entire package and spreader may be constructed essentially of a cardboard blank and the like.

While a preferred embodiment of the invention has been described using specific terms, such description is for illustrative purposes only, and it is to be understood that changes and variations may be made without departing from the spirit or scope of the following claims.

What is claimed is:

1. A combination package and spreader for granular fertilizer and the like including, an elongated container constructed of relatively stiff cardboard like material for containing the granular fertilizer, said container having a substantially uniform rectangular cross-section, said container having a straight lower corner portion adjacent the surface upon which the fertilizer is to be spread when held inclined thereto in spreading position, a shaft disposed in the lower corner portion of the container having a scalloped portion therein, an open dispensing portion in said lower corner portion, said dispensing means being effectively covered by said shaft to substantially limit the fertilizer dispensed therethrough to that delivered thereto by the scalloped portion, a removable means covering the dispensing portion other than when spreading the fertilizer, and spiked wheels carried by said shaft for moving the container over the surface upon which fertilizer is to be spread while operating the metering means with proper agitation to insure the proper delivery of fertilizer to the dispensing portion, whereby granular fertilizer may be packaged and distributed from a single container in metered amounts.

2. A combination package and spreader for granular fertilizer and the like including, an elongated container constructed of relatively stiff cardboard like material for containing the fertilizer, a shaft disposed in the lower portion of the container, metering means carried by said shaft for retaining given amounts of fertilizer, a plurality of spaced openings in the lower portion of the container, a first apertured tape covering certain spaced openings but having apertures in register with other spaced openings, a second tape overlying said first apertured tape closing the other spaced openings, said shaft overlying said openings so as to limit the fertilizer distributed from the openings to that delivered thereto by the metering means, and spiked wheels carried by said shaft for moving the container over the surface upon which fertilizer is to be spread while operating the metering means with proper agitation to insure the proper delivery of fertilizer to the openings, whereby granular fertilizer may be packaged within and distributed from a single container in metered amounts.

References Cited by the Examiner

UNITED STATES PATENTS

| | | | |
|---|---|---|---|
| 1,977,759 | 10/34 | Ford | 222—541 X |
| 2,801,772 | 8/57 | Schiebel | 222—177 |
| 3,080,098 | 3/63 | Fierman | 222—177 X |
| 3,107,822 | 10/63 | Regenstein | 222—177 |
| 3,113,702 | 12/63 | Luedtke | 222—177 |

LOUIS J. DEMBO, *Primary Examiner.*